United States Patent Office 3,072,095
Patented Jan. 8, 1963

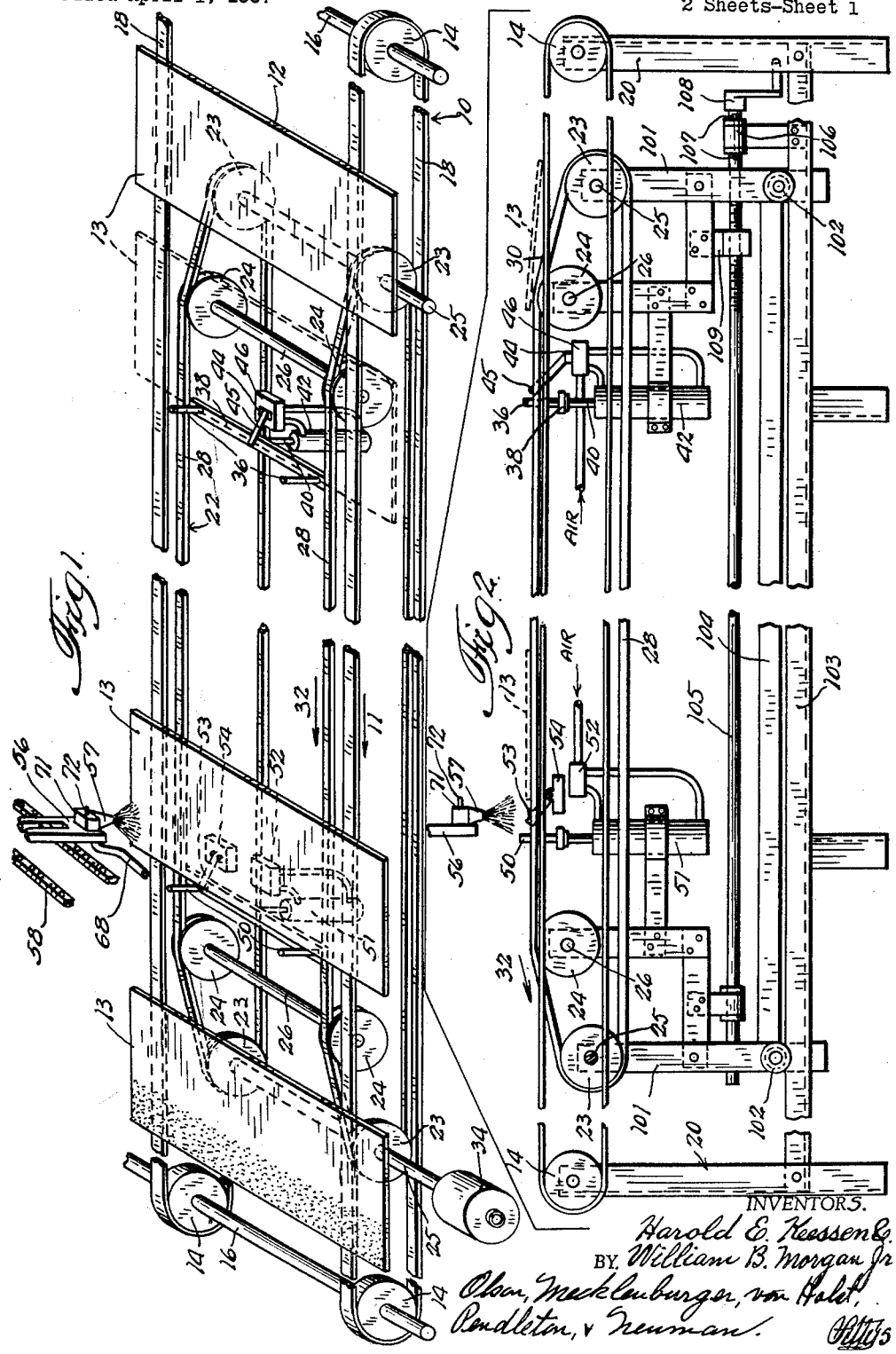

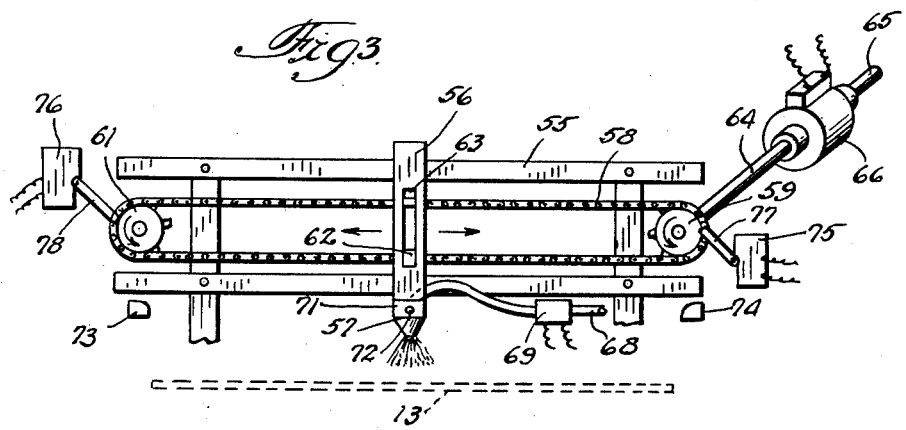
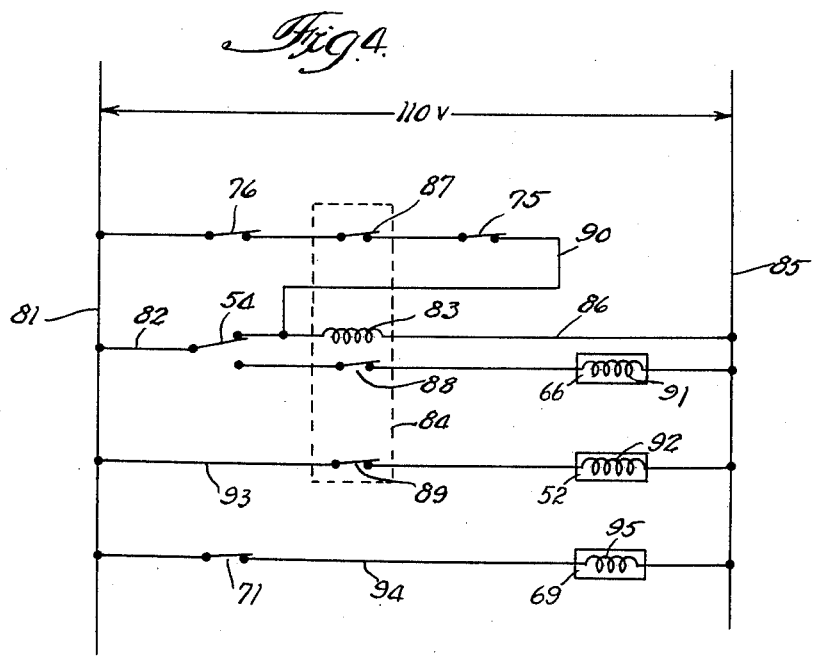

3,072,095
AUTOMATIC SPRAYING APPARATUS
Harold E. Keessen, Lansing, and William R. Morgan, Jr., Clarendon Hills, Ill., assignors to United States Gypsum Company, Chicago, Ill., a corporation of Illinois
Filed Apr. 1, 1957, Ser. No. 649,680
6 Claims. (Cl. 118—6)

This invention relates to conveying apparatus and has special reference to conveyors for moving and positioning sheets or other articles for operations thereon during their manufacture.

More particularly, this invention relates to supplementary or auxiliary conveying apparatus intended for use in conjunction with other apparatus used in the production of articles such, for example, as asbestos-cement siding or shingles.

During the production of such articles it is frequently necessary to perform certain operations thereon while the articles are stationary or substantially so. These operations while the articles are stationary often require that the speed of the entire movement of articles during their manufacture be substantially reduced to enable the desired operations to take place. The present apparatus permits such operations without reducing the over-all rate of speed of production of the articles.

While the present conveying apparatus has wide application, it is described herein in a preferred form for use with and supplemental to apparatus for producing asbestos-cement shingles and siding.

It has been found that a very effective illusion of thickness can be created in walls made from shingles and other siding material arranged in overlapping relation if a band of color is applied to the top edge of each shingle or piece of siding before installation, so that a predetermined portion of the colored band remains exposed after installation. The edge painting operation is preferably carried out while the shingle or siding is stationary. This would ordinarily necessitate slowing down the entire production line to enable each shingle to be treated. However, through the use of the present auxiliary conveying apparatus the desired painting operation may be performed without in any way affecting the otherwise normal, preferably continuous, movement of the shingles or siding during their manufacture.

The conveyor of the present invention is intended for use with regular production apparatus having means such as a pair of spaced conveyor belts for transporting finished or partly finished articles between two locations. In the embodiment disclosed herein the auxiliary conveyor is provided with auxiliary conveying means such as a pair of spaced conveyor belts for being positioned adjacent to the main conveyor belts of the production apparatus. These auxiliary belts travel in the same direction as the main belts but operate at a substantially greater rate of speed. In addition, the auxiliary belts have opposed inclined end portions with a horizontal section therebetween so that a siding member being transported along the main conveyor will be picked up by the auxiliary belts, moved up one inclined end of the auxiliary belts, and after traversing the length thereof moved down the opposite inclined end portion which returns the article to the main belts.

In the course of traversing the horizontal portion of the auxiliary conveyor the siding member may be positioned thereon so as to extend normal to the direction of movement of the conveyor. When so positioned the siding member is stopped and remains stationary while the painting operation is performed thereon. Upon completion of this operation the shingle is returned to the main conveyor belts and thereafter proceeds in the normal manner. Because of the faster speed of the auxiliary conveyor the painting operation may be effected and the siding member returned to the main conveyor without in any way affecting the regular movement of the shingles during their production.

An object of the present invention is to provide auxiliary conveying apparatus for use with regular production apparatus to permit the performance of operations on articles being manufactured while they are stationary without slowing down the normal speed of movement of the articles during their regular process of manufacture.

Another object of this invention is to provide auxiliary conveying apparatus of the above type which may be employed with asbestos-cement shingle manufacturing equipment to paint a strip or band adjacent one edge of the shingles during their manufacture.

A further object of this invention is to provide auxiliary conveying apparatus which functions automatically to perform the desired operations.

Still another object is to provide such auxiliary conveying apparatus which may be expeditiously integrated with processing apparatus normally found in manufacturing plants with a minimum of expense and effort.

Further objects and advantages will be apparent from the following description and claims when considered together with the accompanying drawings, in which:

FIGURE 1 is a partial perspective view of an auxiliary conveyor embodying the present invention integrated with other conveying apparatus;

FIG. 2 is a side elevational view of the apparatus illustrated in FIG. 1 with certain additional structural elements;

FIG. 3 is an elevational view of the paint-spraying apparatus; and

FIG. 4 is a wiring diagram of the electrical controls for positioning the shingles for the painting operation and the actuation of the painting apparatus.

Referring more particularly to the drawings, there is shown a preferred embodiment of the present invention integrated with the main conveying system 10 of a portion of the production equipment used to coat or otherwise complete articles such as asbestos-cement shingles indicated by the numeral 12. The conveying system 10 is of conventional construction and may comprise a plurality of pulleys 14 fixedly mounted on rotatable shafts 16 for driving belts 18 or other suitable conveying members in the direction of the arrow 11. The shafts 16 may be journaled in a suitable supporting structure 20.

As above mentioned it has been ascertained that a very effective illusion of thickness can be created in walls built with shingles arranged in overlapping relationship if a band of color is applied to the top edge of each course of such width that a portion of an inch or so in width will remain exposed in the completed construction. It is desirable that the paint or other coloring material be applied to the shingle without materially affecting the usual shingle-manufacturing operations, and without requiring changes in the apparatus normally utilized or its speed of operation. This may be accomplished through the use of the present auxiliary conveyor 22 when employed with other apparatus such as the conveyor 10 of an asbestos cement shingle machine.

The auxiliary conveyor 22 is preferably disposed between the main conveyor belts 18 and may comprise a plurality of pulleys 23 and 24 which are fixedly mounted on the rotating shafts 25 and 26, respectively, and drive endless belts such as the belts 28. As shown particularly in FIG. 2, the pulleys 23 are mounted below both the pulleys 14 of the main conveyor and the pulleys 24 of the auxiliary conveyor, and the pulleys 24 extend above the pulleys 14. With this construction the belts 28 of the auxiliary conveyor move upwardly in an inclined direction from the pulleys 23, which are below the pulleys 14, to the adjacent set of pulleys 24 where the belts 28 are above the belts 18 of the main conveyor. At the opposite or discharge end of the auxiliary conveyor the belts move downwardly from the upper pulleys 24 in an inclined direction to the lower pulleys 23. Consequently a shingle 12 being conveyed by the main conveyor belts 18 will be picked up by the belts 28 of the auxiliary conveyor as they pass upwardly through the plane of the upper surfaces of the belts 18 at the point indicated by the numeral 30. Thereafter the shingle is moved forwardly in the direction of the arrow 32 until adjacent the discharge end of the auxiliary conveyor, where the belts 28 drop down below the upper plane of the belts 18, at which point the shingles are again picked up by the main conveyor belts 18.

Suitable driving means such as a motor 34 may be connected to one of the shafts 25 for driving the pulleys 23 at a relatively high rate of speed to cause the belts 28 to move substantially faster than the main conveyor belts 18. This permits the shingles on the auxiliary conveyor to be stopped for a period of time, such as for the painting operation, and still return to the main conveyor belt while maintaining the same average rate of speed as that of the main conveyor belt.

The present auxiliary conveyor is also provided with automatic aligning and stop means for maintaining the shingle substantially stationary in the proper position during the painting operation and thereafter permitting its advance to continue. Located adjacent the receiving end of the auxiliary conveyor there are spaced transversely aligned pins 36 projecting upwardly from an elongated bar 38 reciprocally movable in a generally vertical plane by suitable means such as the piston rod 40 connected to the piston of a vertically arranged pneumatic cylinder 42. A switch such as a micro limit switch 44 having a switch arm 45 positioned in the path of the shingles passing along the auxiliary conveyor belts 28 is connected to a solenoid valve 46 for controlling the operation of the pneumatic cylinder 42 and the stop fingers 36. The switch arm 45 is located substantially midway between the auxiliary conveyor belts 28, and the piston rod and fingers 36 are normally in the raised position shown particularly in FIG. 2, and are only depressed while a shingle contacts the switch arm 44.

In the normal course of operation a shingle 12 picked up by the auxiliary belts 28 from the main conveyor belts 18 is advanced at an increased rate of speed until its opposite end portions abut the normally raised aligning pins 36. The switch arm 45 is depressed by the shingle passing thereover and actuates the switch 44 and solenoid valve 46 to direct air into the upper end of the pneumatic cylinder forcing the piston and aligning fingers 36 downwardly. This operation is so timed that the fingers 36 will be moved to lower position, permitting advance of the shingle as soon as the shingle is positioned with its longitudinal axis normal to the direction of travel of the shingle. When the shingle passes beyond the switch arm 45, the solenoid valve is again actuated to cause the pins 36 to return to normal raised position.

Transversely aligned stop pins 50 are also arranged adjacent the discharge end of the auxiliary conveyor for holding the transversely arranged shingles substantially stationary for a period of time sufficient to permit the painting of a band thereon or other operation. The stop pins 50 are vertically movable by the operation of the piston of a pneumatic cylinder 51 controlled by a solenoid or other suitable valve 52.

Just prior to reaching the stop finger 50 the shingle 12 engages a switch arm 53 of a double-throw switch 54. This starts the operation of the paint-spraying equipment shown, particularly in FIG. 3, which moves from one side of the path of travel of the shingle to the opposite side while the shingle is stationary and sprays the desired strip or band of color on the shingle. As soon as the spray gun reaches the other side of the path of travel of the shingle the spray gun is stopped, the stop fingers 50 are lowered, and the painted shingle continues along the auxiliary conveyor belts 28 until it returns to the main conveyor belts 18.

The paint-spraying equipment illustrated in FIG. 3 comprises a transversely extending supporting and guiding frame 55 on which is mounted a carriage 56 carrying a spray gun 57. The carriage 56 is mounted for horizontal reciprocating movement on the supporting frame 55.

Movement is imparted to the carriage 56 by means of a sprocket chain 58 passing over a pair of sprocket wheels 59 and 61 which rotate in the direction of the arrows indicated thereon. A pin 62 projecting from the sprocket chain 58 engages a vertical slot 63 in the carriage 56. Accordingly, as the sprocket chain 58 rotates about the sprocket wheels 59 and 61, the pin 62 in the slot 63 causes the carriage 56 to be reciprocated between the opposite ends of the support 55. The sprocket 59 may be driven by a shaft 64 connected to the constantly rotating drive shaft 65 by any suitable clutch such as a combined magnetic clutch and brake 66.

Paint under pressure is supplied to the nozzle 57 through the supply line 68 having a solenoid valve 69 therein at or adjacent the nozzle for controlling the supply of paint to the nozzle. A switch, such as a microswitch 71, having a contact 72 is connected to the solenoid valve 69. The switch 71 is normally closed to permit the flow of paint through the supply line 68. When opened the switch 71 actuates the solenoid valve 69 to prevent paint being supplied to the nozzle 57. A pair of contour cams 73 and 74 are so arranged and positioned at opposite sides of the conveyor that when the carriage 56 is at either end of its path of movement the contact 72 will engage one of the contour cams to open the switch 71 and stop the supply of paint to the nozzle 57.

A pair of switches such as microswitches 75 and 76 having contact arms 77 and 78, respectively, are positioned so that the contact arms will be momentarily engaged by the pin 62 as it moves about the sprockets 59 and 61. Engagement of the pin 62 with either of the contact arms 77 or 78 disconnects the clutch 66 and sets a brake which stops the rotation of the chain 58. At the same time the stop pins 50 are lowered to permit the shingle to pass thereover.

Referring more particularly to FIG. 4 there is shown a double-throw switch 54 which is moved from its normal position illustrated, with the upper contacts closed and the lower contacts open, to lower position in which the upper contacts are open and the lower contacts are closed. In the normal position of the switch 54 with the upper contacts closed current flows from one of the leads 81 through conductor 82, the upper contacts of the switch 54, winding 83 of a relay 84, and the conductor 86 to the other lead 85. The relay 84 has three sets of contacts, 87, 88 and 89, which are closed when the winding 83 of the relay is energized and otherwise are open.

A holding circuit 90 having microswitches 75 and 76 in series with the relay contacts 87 connects the lead 81 with the conductor 86 between the winding 83 and the switch 54. The conductor 82 is also connected to the lead 85 through the lower contacts of the switch 54, the contacts 88 of the relay and the winding 91 of the clutch 66. The winding 92 of the solenoid valve 52 and the contacts 89 of relay 84 are in series in a conductor 93 connecting the leads 81 and 85. Accordingly, whenever the relay is closed by energization of the winding 83, valve 52 controls the air supply to the cylinder 51 to maintain the stop fingers 50 in raised position. The paint gun microswitch 71 is in series with the winding 95 of the solenoid valve 69 in the conductor 94.

The operation of the paint spray device is as follows:

With the contact arm 53 in raised position the upper contacts of the switch 54 are closed energizing the relay to close the contacts 87, 88 and 89 thereof, and the relay is thereafter held in this position by the holding circuit 90, irrespective of the position of the switch 54 until one of the switches 75 or 76 is opened. When a shingle passing along the auxiliary conveyor belts 28 engages the contact arm 53 of the switch 54, the switch is thrown to open the top contacts and close the bottom contacts thereof. This actuates the clutch 66 to start the sprocket wheel 59 and sprocket chain 58.

As soon as the carriage 56 starts to move, the switch contact 72 is disengaged from the contour cam 73 or 74 with which it was in contact, opening the solenoid valve 69 and permitting paint to flow through the nozzle 57. This continues until the carriage 56 moves to the opposite side of the conveyor, and the pin 62 momentarily engages the contact arms of either of the switches 75 or 76. After engaging either of the contact arms 77 or 78 the pin coasts a distance therebeyond before stopping. However, the momentary opening of the holding circuit 90 opens the relay contacts 87, 88 and 89 disengaging the clutch 66, setting the brake, and stopping further rotation of the sprocket chain with the contact 72 of the microswitch 71 in open position due to its engagement with one of the contour cams 73 and 74. Opening of the relay contact 89 deenergizes the winding 92 of the solenoid valve 52 resulting in the stop fingers 50 moving to lower position and remaining there while the shingle is passing over the contact arm 53 of the switch 54. As soon as the shingle has passed beyond the contact arm 53 the arm rises and restores switch 54 to its normal position with the upper contacts 54 closed and the winding 83 of the relay 84 energized to close the contacts 87, 88 and 89.

In order to control the width of the paint strip or band on the shingle the auxiliary conveyor is made longitudinally adjustable so that it can be moved with respect to the spray nozzle 57. One means of providing this adjustment is shown in FIG. 2. The supports 101 in which the pulleys 23 and 24 are journaled are provided with rollers 102 for moving longitudinally along the rail portions 103 of the main conveyor. A bar 104 maintains the supports 101 a fixed distance apart. Movement of the auxiliary conveyor may be provided by means of a threaded rod 105 mounted in a bearing 106 supported on the rail 103. Longitudinal movement of the threaded rod 105 is prevented by means of the pins 107 or other suitable means. The rod 105 passes through the internally threaded collar 109 carried by one of the supports 101 and may be rotated by a crank 108. With this construction rotation of the rod 105 moves the entire auxiliary conveyor longitudinally and permits its adjustment with respect to the paint spray equipment.

The present auxiliary conveyor may be readily integrated with a main conveyor system to receive articles from the main conveyor, hold them stationary in proper position while a band is painted thereon or other operation performed, and thereafter return them to the main conveyor without any reduction in their general rate of speed.

While particular embodiments of this invention have been illustrated and described, it will be understood of course that the invention is not to be limited thereto since many modifications may be made, and it is contemplated therefore, by the appended claims, to cover any modifications that come within the true scope of this invention.

We claim:

1. In combination, a pair of spaced substantially parallel main conveyor belts movable at a predetermined rate of speed, a pair of auxiliary conveyor belts in substantially parallel relation with said main conveyor belts having opposed portions intersecting the plane of said main conveyor belts, said auxiliary conveyor belts also having portions intermediate said intersecting portions disposed above the plane of subjacent portions of said main conveyor belts, the intermediate portion of each of said auxiliary belts being substantially parallel with and in substantial juxtaposition with one of said main conveyor belts whereby an item carried by said main conveyor belts may move onto said auxiliary conveyor belts from said main conveyor belts and be returned to said main conveyor belts in the normal course of operation, transversely aligned stop means disposed in the path of travel of said auxiliary conveyor belts, and means for retracting said stop means below the plane of said auxiliary conveyor belts upon contact being effected with said stop means.

2. In combination, a pair of spaced, substantially parallel main conveyor belts movable at a predetermined rate of speed, a pair of auxiliary conveyor belts in substantially parallel relation with said main conveyor belts having opposed portions intersecting the plane of said main conveyor belts, said auxiliary conveyor belts also having portions intermediate said intersecting portions disposed above the plane of subjacent portions of said main conveyor belts, the intermediate portion of each of said auxiliary belts being substantially parallel with and in substantial juxtaposition with one of said main conveyor belts whereby an item carried by said main conveyor belts may move onto said auxiliary conveyor belts from said main conveyor belts and be returned to said main conveyor belts in the normal course of operation; retractable, transversely aligned stop means movable between retracted and erect positions disposed in the path of travel of said auxiliary conveyor belts, processing means transversely movable across said auxiliary conveyor belts when said stop means are in an erect position, and means for retracting said stop means after said processing means has moved transversely to said auxiliary conveyor belts.

3. In a combination for the processing of an edge portion of a shingle or the like, a pair of spaced main conveyor belts on which such shingle is disposed and moved at a predetermined rate of speed, a pair of auxiliary conveyor belts in parallel relation with said main conveyor belts having opposed sloping portions intersecting the plane of said main conveyor belts and having portions intermediate said sloping portions disposed above the plane of said main conveyor belts, each auxiliary belt having an intermediate portion between said sloping portions substantially parallel with and in substantial juxtaposition with one of said main conveyor belts whereby a shingle may move onto said auxiliary conveyor belts from said main conveyor belts and be returned to said main conveyor belts in the normal course of operation, retractable stop means aligned transversely of the path of travel of shingles on said auxiliary conveyor belts, means actuated by said shingles to retract said stop means and permit said shingles to continue after said stop means has aligned the forward edge of an engaged shingle substantially transversely to said auxiliary conveyor belts, said auxiliary conveyor belts moving at a greater rate of speed than said main conveyor belts.

4. In combination, a pair of main conveyor belts, a pair of continuous auxiliary conveyor belts disposed parallel to said main conveyor belts and intersecting the plane of said main conveyor belts at opposed portions thereof, said auxiliary conveyors having intermediate portions between said opposed portions disposed above the plane of said main conveyor belts, each intermediate portion of each of said auxiliary conveyor belts being disposed substantially parallel with and in substantial juxtaposition with one of said conveyor belts whereby an item may move onto said auxiliary conveyor belts from said main conveyor belts and be returned to said main conveyor belts in the normal course of operation, first transversely aligned stop means normally disposed in the path of travel of said auxiliary conveyor belts, means for retracting said stop means below the plane of said auxiliary conveyor belts upon contact being effected with said stop means, second transversely aligned stop means spaced from said first stop means normally disposed in the path of travel of said auxiliary conveyor belts, and control means actuated when contact is made with said second stop means; said control means actuating a processing means transversely operable over said auxiliary conveyor belts, said processing means retracting said second stop means from its normal position following an operating cycle thereof, said auxiliary conveyor belts moving at a higher rate of speed than said main conveyor belts.

5. In a combination for processing an edge portion of a shingle or the like, a pair of spaced main conveyor belts on which said shingle is disposed and moved at a predetermined rate of speed, auxiliary conveyor belts disposed parallel to said main conveyor belts having sloping opposed portions intersecting the plane of said main conveyor belts and having portions intermediate said sloping opposed portions disposed above the plane of said main conveyor belts, each intermediate portion of each of said auxiliary conveyor belts being disposed substantially parallel with and in substantial juxtaposition with one of said main conveyor belts whereby a shingle may move onto said auxiliary conveyor belts from said main conveyor belts and be returned to said main conveyor belts in the normal course of operation, retractable stop means aligned transversely of the path of travel of shingles on said auxiliary conveyor belt, means actuated by said shingles to retract said stop means and permit said shingles to continue after said stop means have aligned the forward edge of a shingle engaged substantially transversely to said auxiliary conveyor belts, said auxiliary conveyor belts moving at a greater rate of speed than said main conveyor belts, second retractable stop means aligned transversely of the path of travel of said shingles on said auxiliary conveyor belts normally positioned to stop an engaged shingle in an aligned position, processing means movable over an edge portion of a shingle in such aligned position actuated by said shingle in the course of being moved into said aligned position, and control means actuated by said processing means for retracting said second stop means at the completion of such processing.

6. The combination as recited in claim 5 in which said shingle processing is effected by paint spraying means mounted on a carriage driven by an endless chain movable over the edge of a shingle in the stopped condition.

References Cited in the file of this patent

UNITED STATES PATENTS

| | | |
|---|---|---|
| Re. 25,108 | Juvinall | Jan. 2, 1962 |
| 167,519 | Fowler | Sept. 7, 1875 |
| 722,937 | Berg | Mar. 17, 1903 |
| 1,094,451 | Martin | Apr. 28, 1914 |
| 1,642,992 | Fuller | Sept. 20, 1927 |
| 1,812,854 | Beach | July 7, 1931 |
| 1,829,035 | Besal et al. | Oct. 27, 1931 |
| 1,929,703 | McDonough | Oct. 10, 1933 |
| 2,047,406 | Copping | July 14, 1936 |
| 2,139,403 | Cole | Dec. 6, 1938 |
| 2,246,502 | Bramsen et al. | June 24, 1941 |
| 2,335,790 | Ransburg | Nov. 30, 1943 |
| 2,557,479 | Smith | June 19, 1951 |
| 2,588,125 | Knowland et al. | Mar. 4, 1952 |
| 2,610,605 | Paasche | Sept. 16, 1952 |
| 2,624,440 | Hornberger | Jan. 6, 1953 |
| 2,747,539 | Peffer | May 29, 1956 |
| 2,769,728 | Juvinall | Nov. 6, 1956 |
| 2,804,191 | King | Aug. 27, 1957 |
| 2,840,224 | Lelief | June 24, 1958 |